US010798867B2

(12) United States Patent
Debbaut

(10) Patent No.: US 10,798,867 B2
(45) Date of Patent: Oct. 13, 2020

(54) AGRICULTURAL SYSTEM

(71) Applicant: CNH Industrial America LLC, New Holland, PA (US)

(72) Inventor: Thomas Debbaut, Ronsele (BE)

( * ) Notice: Subject to any disclaimer, the term of this patent is extended or adjusted under 35 U.S.C. 154(b) by 237 days.

(21) Appl. No.: 15/975,735

(22) Filed: May 9, 2018

(65) Prior Publication Data

US 2018/0325014 A1  Nov. 15, 2018

(30) Foreign Application Priority Data

May 9, 2017  (BE) .................................. 2017/5341

(51) Int. Cl.
*A01B 69/04* (2006.01)
*A01D 89/00* (2006.01)
(Continued)

(52) U.S. Cl.
CPC ............ *A01B 69/008* (2013.01); *A01D 89/00* (2013.01); *G05D 1/0088* (2013.01); *G05D 1/0223* (2013.01); *G05D 1/0274* (2013.01); *G05D 1/042* (2013.01); *G05D 1/101* (2013.01); *G06Q 10/00* (2013.01); *G06Q 10/04* (2013.01); *G06Q 10/047* (2013.01); *G06Q 10/20* (2013.01); *G06Q 50/02* (2013.01); *B64C 39/024* (2013.01); *B64C 2201/126* (2013.01); *B64C 2201/141* (2013.01); *G05D 2201/0201* (2013.01)

(58) Field of Classification Search
CPC ...... A01B 69/008; G06Q 50/02; G06Q 10/20; G06Q 10/04; G06Q 10/00; G06Q 10/047; G05D 1/0274; G05D 1/101; G05D 1/0223; G05D 1/0088; G05D 1/042; G05D 2201/0201; A01D 89/00; B64C 2201/126; B64C 39/024; B64C 2201/141
See application file for complete search history.

(56) References Cited

U.S. PATENT DOCUMENTS

2005/0197175 A1* 9/2005 Anderson ............ A01B 69/008
  460/1
2010/0036569 A1  2/2010 Hel et al.
(Continued)

FOREIGN PATENT DOCUMENTS

EP  1548531 A1  6/2005
EP  2538298 A1  12/2012
(Continued)

OTHER PUBLICATIONS

SenseFly, web capture of https://www.sensefly.com/drones/ebee-ag.html from Mar. 12, 2016, last accessed May 8, 2018, 8 pages.

*Primary Examiner* — Adam R Mott
(74) *Attorney, Agent, or Firm* — Peter Zacharias; Patrick Sheldrake

(57) ABSTRACT

A system includes a vehicle configured to acquire field-data representative of a field having crop material that is to be picked up from the field; and a controller configured to determine control-instructions for a machine to pick up the crop material, based on the field-data. The control-instructions include machine-steering-instructions for automatically controlling the direction of travel of the machine, such that the machine follows a specific route through the field.

13 Claims, 1 Drawing Sheet

(51) Int. Cl.
*G05D 1/02* (2020.01)
*G05D 1/00* (2006.01)
*G05D 1/04* (2006.01)
*G06Q 50/02* (2012.01)
*G06Q 10/00* (2012.01)
*G06Q 10/04* (2012.01)
*G05D 1/10* (2006.01)
*B64C 39/02* (2006.01)

(56) References Cited

U.S. PATENT DOCUMENTS

| | | | |
|---|---|---|---|
| 2012/0029732 A1 | 2/2012 | Meyer | |
| 2012/0112896 A1 | 5/2012 | Clair et al. | |
| 2017/0082442 A1* | 3/2017 | Anderson | A01B 69/00 |
| 2019/0384283 A1* | 12/2019 | Chowdhary | G06F 16/29 |

FOREIGN PATENT DOCUMENTS

| | | |
|---|---|---|
| EP | 2716543 A1 | 4/2014 |
| FR | 3006296 A1 | 12/2014 |
| WO | 2012175592 A1 | 12/2012 |
| WO | 2014053298 A1 | 4/2014 |
| WO | 2014137533 A2 | 9/2014 |
| WO | 2014202777 A1 | 12/2014 |

* cited by examiner

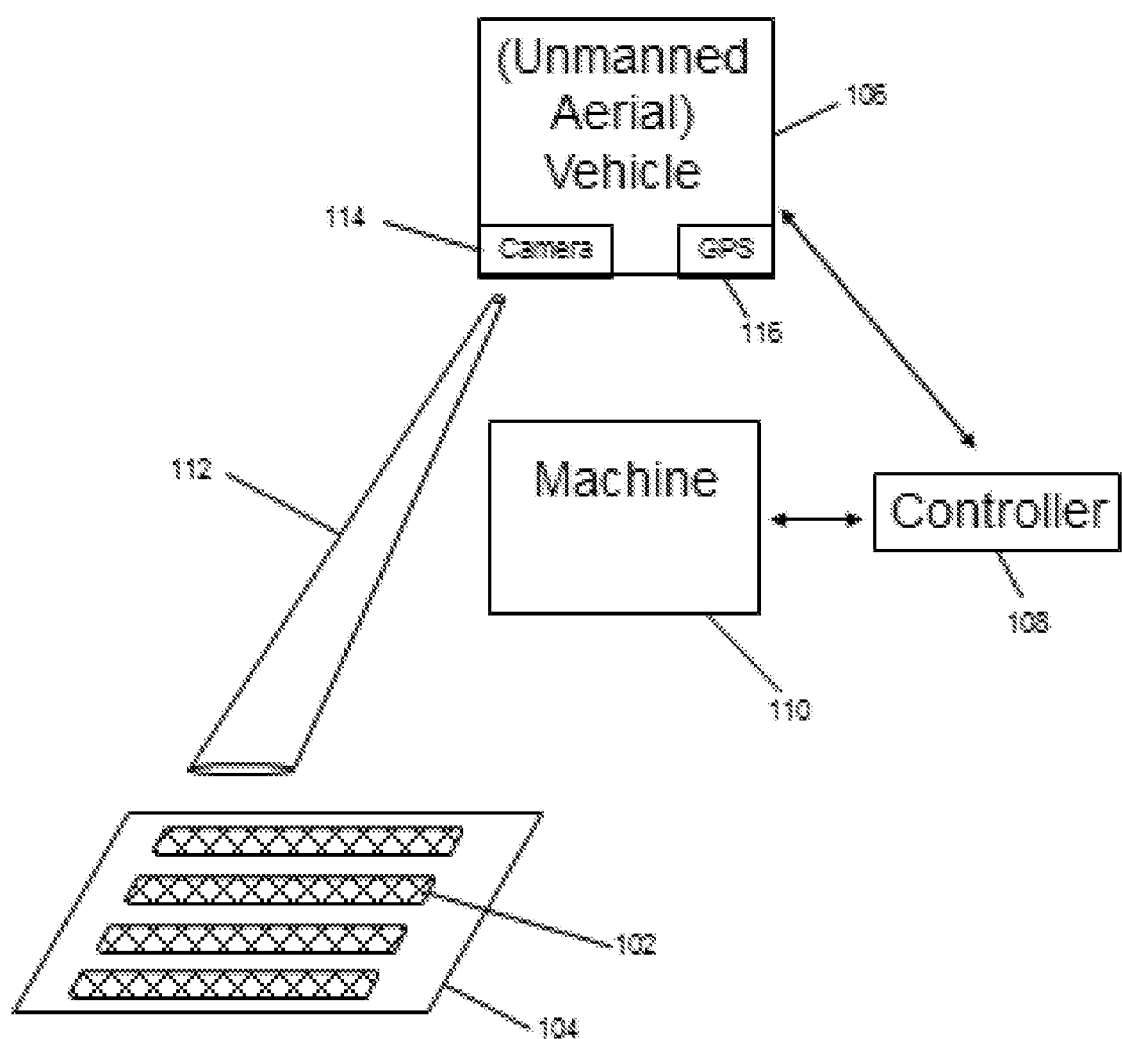

AGRICULTURAL SYSTEM

BACKGROUND OF THE INVENTION

In order to make agricultural machines more autonomous, such as for automatic feed rate driving speed control, there is a need for information about the field and the crop on that field. Tractors equipped with sensors to measure swath in front of the machine can result in distortions in the measured signals due to dust and flying particles in the vicinity of the tractor.

SUMMARY OF THE INVENTION

According to first aspect of the invention, there is provided a system comprising:

a vehicle configured to acquire field-data representative of a field having crop material that is to be picked up from the field; and a controller configured to determine control-instructions for a machine to pick up the crop material, based on the field-data;

wherein the control-instructions comprise machine-steering-instructions for automatically controlling the direction of travel of the machine, such that the machine follows a specific route through the field.

Such a system can enable the machine to be automatically controlled such that it follows an advantageous route when picking up the crop material.

The controller may be further configured to:

determine material-map-data that is representative of the location of rows of the material that are to be picked up from the field, based on the field-data; and determine the control-instructions for the machine to pick up the crop material, based on the material-map-data.

The controller may be configured to:

determine machine-route-data, representative of the specific route to be taken by the machine, based on the material-map-data; and determine the control-instructions for the machine based on the machine-route-data.

The machine-route-data may comprise a sequence of locations for the machine to pass when picking up the crop material.

The control-instructions may further comprise route-speed-instructions for automatically controlling the speed of the machine at locations along the specific route.

The vehicle may also be configured to acquire field-location-data associated with the field-data. The controller may be configured to determine the control-instructions based on the field-data and the field-location-data.

The controller may be further configured to: determine crop-property-data that is representative of the crop material in the field, based on the field-data; and determine the control-instructions for a machine to pick up the crop material, based on the crop-property-data.

The crop-property-data may be representative of one or more of: material-size-data; crop-type; temperature of material; humidity of material; length of stalks in the material; material density; and stub height.

The controller may be configured to: determine field-property-data that is representative of a property of the field, based on the field-data; and determine the control-instructions also based on the field-property-data.

The field-property-data may comprise field-contour-data and/or field-wetness-data.

The field-data may comprise field-image-data.

The vehicle may comprise a 3D-scanner or 3D-camera configured to acquire field-3D-image-data representative of the field; and the controller may be configured to determine the control-instructions based on the field-3D-image-data.

The vehicle may comprise a height-measurement-sensor configured to acquire material-height-data representative of the height of the crop material; and the controller may be configured to determine the control-instructions also based on the material-height-data.

The vehicle may comprise an unmanned aerial vehicle.

The unmanned aerial vehicle may be configured to acquire, from a first altitude:

overview-field-data representative of the field having the crop material that is to be picked up from the field; and associated overview-location-data.

The controller may be configured to:

determine, based on the overview-field-data and the overview-location-data, vehicle-route-data that is representative of a secondary-route to be followed by the unmanned aerial vehicle to acquire secondary information about the crop material that is to be picked up from the field; and determine vehicle-control-instructions for the unmanned aerial vehicle based on the vehicle-route-data, wherein the vehicle-control-instructions comprise vehicle-steering-instructions for automatically controlling the direction of travel of the unmanned aerial vehicle, such that the unmanned aerial vehicle follows the secondary-route.

The unmanned aerial vehicle may be configured to:

process the vehicle-control-instructions such that it follows the secondary-route; and whilst following the secondary-route, acquire secondary-field-data representative of the crop material that is to be picked up from the field, from a second altitude, wherein the second altitude may be lower than the first altitude.

The controller may be configured to determine the control-instructions for the machine to pick up the crop material, based on the secondary-field-data.

The overview-field-data may comprise two-dimensional-image-data, and the secondary-field-data may comprise three-dimensional-image-data.

The controller may be configured to determine the vehicle-control-instructions for the unmanned aerial vehicle such that it includes landing-locations and/or stub-height-measurement-locations. The unmanned aerial vehicle may be configured to land or be at a third altitude at the stub-height-measurement-locations and acquire stub-height-information. The controller may be configured to determine the control-instructions for the machine to pick up the crop material, also based on the stub-height-information.

The vehicle may comprise an unmanned land vehicle.

The controller may be configured to determine a bale-count, representative of a number of bales that will be attained by picking up the crop material, based on the field-data.

The system may further comprise a machine that is configured to be operated in accordance with the control-instructions.

There may be provided a method of controlling an agricultural machine, the method comprising:

a vehicle acquiring field-data representative of a field having crop material that is to be picked up from the field; and determining control-instructions for the agricultural machine to pick up the crop material, based on the field-data, wherein the control-instructions comprise machine-steering-instructions for automatically controlling the direction of travel of the machine, such that the agricultural machine follows a specific route through the field.

There may be provided a method of controlling an agricultural machine, the method comprising:

an unmanned aerial vehicle acquiring, from a first altitude:

overview-field-data representative of the field having crop material that is to be picked up from the field; and associated overview-location-data;

determining, based on the overview-field-data and the overview-location-data, vehicle-route-data that is representative of a secondary-route to be followed by the unmanned aerial vehicle to acquire secondary information about the crop material that is to be picked up from the field;

determining vehicle-control-instructions for the unmanned aerial vehicle based on the vehicle-route-data, wherein the vehicle-control-instructions comprise vehicle-steering-instructions for automatically controlling the direction of travel of the unmanned aerial vehicle, such that the unmanned aerial vehicle follows the secondary-route;

the unmanned aerial vehicle processing the vehicle-control-instructions such that it follows the secondary-route, and whilst following the secondary-route, acquiring secondary-field-data representative of the crop material that is to be picked up from the field, from a second altitude, wherein the second altitude is lower than the first altitude; and determining control-instructions for the agricultural machine to pick up the crop material, based on the secondary-field-data, wherein the control-instructions comprise machine-steering-instructions for automatically controlling the direction of travel of the agricultural machine, such that the machine follows a specific route through the field.

There may be provided a computer program, which when run on a computer, causes the computer to configure any apparatus, including a controller, processor, machine, vehicle or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawing in which:

FIG. 1 shows schematically a system associated with picking up crop material from an agricultural field.

DETAILED DESCRIPTION OF THE DRAWINGS

FIG. 1 shows schematically a system associated with picking up crop material 102 from an agricultural field 104. The system includes a vehicle 106, a controller 108 and a machine 110.

The crop material 102 may be hay, straw or similar products that have been left in the field 104 in the form of swaths, that is, elongate rows of the products in question that are heaped in the transverse centre and tend to flatten at the respective transverse edges. Typically a field that has undergone harvesting contains many, essentially mutually parallel, swaths, as shown in FIG. 1. The swaths are spaced from one another by largely consistent gaps.

The vehicle 106 acquires field-data that is representative of the agricultural field 104 having the crop material 102 that is to be picked up from the field 104. The vehicle 106 can include one or more sensors for obtaining this field-data, and a field of view 112 of such a sensor is shown schematically in FIG. 1.

The vehicle 106 is in electronic communication with the controller 108, such that the vehicle 106 can transfer the field-data to the controller 108. It will be appreciated that the controller 108 can be located on the vehicle 106, on the machine 110, or remotely from both the vehicle 106 and the machine 110. For example, the functionality of the controller 108 can be performed on a remote server, such as one "in the cloud".

The controller 108 processes the field-data that was acquired by the vehicle 106 (and optionally also other data, as will be discussed below) to determine control-instructions for the machine 110 to pick up the crop material 102. This processing may be based, directly or indirectly, on the field-data. The machine 110 may be any type of agricultural machine, such as a baler, a forage harvester or a grass pickup wagon.

In this example, the control-instructions comprise machine-steering-instructions for automatically controlling the direction of travel of the machine 110, such that the machine 110 follows a specific route through the agricultural field 104. In this way, the vehicle 106 can acquire information about a field which is to be processed, and the machine 110 can be autonomously controlled such that it follows a specific route through the agricultural field in order to pick up crop material from the field. The route can be planned such that it provides one or more advantages, for example:

(i) efficient machine usage, such as low overall fuel consumption to pick up all of the crop material from the field;

(ii) prioritising pick up of crop material with particular characteristics (as defined by crop-property-data for example, as will be discussed below), such as portions of swath that have a high volume of crop material;

(iii) the route for a forage harvester can be planned such that an associated trailer (that is to be filled by the forage harvester) can accompany the forage harvester in a predefined way, for example such that it is always on the same side of the forage harvester; and (iv) in a baling operation, such that the machine 110 drops bales at desired locations, for instance so that the majority of bales are expected to be dropped in close vicinity to each other, rather than spread out over the entire field, or so that bales will not be dropped on a future trajectory/path that is to be taken by the agricultural machine.

The vehicle 106 can gather data before the machine 110 starts picking up the crop material 102, in which case there is less likely to be dust and flying particles that could otherwise obscure the acquisition of the data that is used to determine the control-instructions for the machine 110. Also, since a large amount of data about the field 104 and/or crop 102 can be made available before the crop 102 is picked up, the controller 108 can better anticipate pile-ups and holes in the swaths of crop material 102. The controller 108 can also calculate the most efficient route before starting picking up the crop material 102 at the field. This can enable full autonomous control of the machine 110 in some examples.

In the following example, the vehicle is an unmanned aerial vehicle 106 (sometimes referred to as a drone). In other examples, the vehicle could be a land vehicle, which may or may not be unmanned. Such a land vehicle can travel in the vicinity of the field 104 to acquire field-data before the machine 110 enters the field 104 to start picking up the crop material 102. For example, the vehicle can travel around the perimeter of the field, either inside or outside the boundary of the field, or can travel through the regions of the field that include the crop material 102.

In some applications a land vehicle can be used to carry more sensors than an aerial vehicle. For example, in some applications the payload that an aerial vehicle can carry may be more limited than that of a land vehicle. Therefore, the land vehicle may be able to carry a greater weight of sensors than an aerial vehicle, and also may have more space available for carrying sensors. This can mean that, for some examples, a land vehicle may be able to take different types of measurements, and possibly more measurements, than an aerial vehicle.

In this example, the unmanned aerial vehicle 106 includes a camera 114, which is an example of a sensor that can acquire field-data in the form of field-image-data. The field-image-data can be two-dimensional-image-data or three-dimensional-image-data, and in some examples the camera can be a 3D-scanner or 3D-camera.

Alternatively, or additionally, the field-data can include: field-radar-data acquired by a radar, field-moisture-data acquired by a moisture-sensor, field-IR-data acquired by an infra-red-sensor, or any other type of field-data from any type of sensor that can acquire information about the agricultural field 104 or the crop material 102 in the agricultural field 104. The controller 108 can process one or more of these different types of field-data, either directly or indirectly, in order to determine the control-instructions for the machine 110.

In this example, the controller 108 determines material-map-data that is representative of the location of the material 102 that is to be picked up from the field 104, based on the field-image-data. For instance, the controller 108 can perform an object recognition algorithm, an edge detection algorithm, or any type of processing that is able to identify the likely location of the material 102 in the field 104. In some examples, the controller 108 can also process expected-material-properties when determining the material-map-data. For example, the expected-material-properties may be representative of the expected width of a row of swath 102 and/or the expected spacing between adjacent rows of swath 102.

In some instances, the controller 108 can also determine machine-route-data, representative of the specific route to be taken by the machine 110, based on the material-map-data. The machine-route-data can comprise a sequence of locations for the machine 110 to pass when picking up the crop material 102. For example, the controller 108 can determine a shortest possible route for picking up all of the crop material 102.

The controller 108 can then determine the control-instructions for the machine to pick up the crop material 102, which can include machine-steering-instructions, based on the machine-route-data and/or material-map-data. (Since the machine-route-data and the material-map-data are calculated using the field-image-data, the control-instructions can be considered to be indirectly based on the field-data.)

In some examples, the control-instructions determined by the controller 108 further comprise route-speed-instructions for automatically controlling the speed of the machine 110 at locations along the specific route. For instance, the controller 108 can automatically determine and apply an appropriate speed for the machine 110 as it travels around corners, or as it drives over an obstacle such as a pit, which may be slower than a speed that is considered suitable for driving in a straight line. Also, as will be discussed in more detail below, the controller 108 may determine how the cross-sectional area of the crop material 102 varies along a row of swath, in which case the controller can automatically apply an appropriate speed for the machine 110 based on the amount of crop material 102 that it is expected to pick up at various points on the determined route.

In this example, the vehicle 106 also acquires field-location-data associated with the field-image-data. For example, the vehicle 106 may have a location-determining-system 116, such as GPS, that provides vehicle-location-data that is representative of the location of the vehicle 106 when the field-image-data is acquired. The controller 108 may also receive camera-direction-data and vehicle-altitude-data. The camera-direction-data may be representative of the direction that the camera is facing relative to the vehicle 106. The camera-direction-data may be hard coded if the camera is non-movably fixed to the vehicle 106. If the camera is movably mounted to the vehicle 106, then the camera-direction-data can take different values, which may be received as an input-signal at the controller 108 from the vehicle 106. The controller 108 can then use a simple trigonometric algorithm to attribute field-location-data to objects/areas that are represented by the field-image-data based on the vehicle-location-data, the camera-direction-data, the vehicle-altitude-data, and a direction of travel of the vehicle 106, as is known in the art.

The controller 108 can then determine the control-instructions for the machine 110 also based on the field-location-data.

In some examples, the controller 108 can determine crop-property-data that is representative of the crop material 102 in the agricultural field 104, based (directly or indirectly) on the field-data. For instance, the controller 108 can perform an object recognition algorithm on the field-image-data in order to determine one or more of crop-type; length of stalks in the material 102, material density, and stub-height-information. The stub height is the height at which the crop is cut off. In some conditions, such as for wheat straw, the swath lays on top of the stubs, which causes the swath to look bigger than it actually is.

In some examples, the controller 108 can also, or instead, process different types of field-data to determine the crop-property-data. For instance, the controller 108 can process field-IR-data to determine the temperature of crop material, or the controller 108 can process field-moisture-data to determine the humidity/wetness of crop material.

In one example, the crop-property-data can include material-size-data that is representative of the size of the crop material 102 in the agricultural field 104. Such material-size-data can include the height, width, cross-sectional area, volume, or shape of the swath (rows of the crop material 102). The crop-property-data can therefore represent one-dimensional, two-dimensional or three-dimensional physical characteristics of the crop material 102, and can be determined based on two-dimensional or three-dimensional image data.

The controller 108 can then determine the control-instructions for the machine 110 based on one or more of the above types of crop-property-data. For example, the controller 108 may cause the machine 110 to travel: (i) more slowly over large portions of crop material (for instance portions that have a material-size-data (such as cross-sectional area) that is greater than a size-threshold-value); (ii) more quickly over thin portions of crop material (for instance portions that have a density that is less than a density-threshold-value), (iii) in a zig-zag path over very narrow swaths to get a good feeding of a precompression chamber of a baler; and (iv) not changing the speed too aggressively (for example such that the acceleration/deceleration of the machine 110 is not greater than a speed-change-threshold) if there is a small interruption of the swath to get more driver comfort (for example, a small interruption can be identified as a height of the swath that is less than a swath-height-threshold for a length of the path that is less than a path-length-threshold).

It will be appreciated that the above examples are non-limiting and that the baler can be automatically controlled based on crop-property-data in numerous other ways. In some examples, different options can be selected by the operator of the baler/tractor, such as when starting a baling operation. For instance, when starting a field, the operator may be able to enter a 'setting' such as the following:

If I hit a wet spot: how should the controller control the baler/tractor—slow down the speed and continue baling or lift the pick-up; and/or If a highly compressed swath is detected: how should the controller control the baler/tractor—slow down the speed and continue baling or lift the pick-up.

In this way, the controller can determine vehicle-control-instructions for the baler 300 based on: (i) one or more of the above types of crop-property-data; and (ii) user input.

Therefore, in a number of ways, the controller 108 can determine the machine-steering-instructions and/or machine-route-data for the machine 110 based on the crop-property-data. For instance, the controller 108 may plan the route for the machine 110 such that regions of the crop material 102 with a higher density are picked up before regions of the crop material 102 that have a lower density. This may be advantageous so that the most valuable crop material (in terms of volume of crop per distance traveled by the machine 110) is picked up first. In another example, the controller 108 may plan the route such that it picks up regions of the crop material 102 that has a lower humidity before regions of the crop material 102 that has a higher humidity. In this way, the more humid crop material 102 will have longer to dry out. As a further example, the controller 108 can determine the machine-route-data for the machine 110 based on the time of day that the crop material 102 is to be picked up and/or a measured or predicted temperature of the crop material 102. It can be advantageous for the crop material 102 to be as cool as possible for baling (for better friction properties). Therefore, the machine-route-data can be planned such that the crop material 102 that is picked up is likely to be below a crop-temperature-threshold. As yet further example, the controller 108 can determine the machine-route-data for the machine 110 based on the humidity/wetness of crop material such that wet spots of the crop material 102 can be baled after each other so as not to mix wet and dry crop in the same bales.

The controller 108 can determine field-property-data that is representative of a property of the agricultural field 104, based on the field-data. For instance, the controller 108 can determine first regions of field-data that correspond to the crop material 102, and second regions of the field-data that correspond to the agricultural field 104 (outside the perimeter of the first regions of field-image-data). As discussed above, the controller 108 can determine crop-property-data based on data that corresponds to the first regions of field-image-data. The controller 108 can also determine field-property-data based on the second regions, and then determine the control-instructions for the machine 110 based on the field-property-data.

The field-property-data can include field-wetness-data that is representative of the wetness of the agricultural field 104. In such an example, the controller 108 can process field-image-data to identify the locations of the second regions of the field-image data that correspond to the agricultural field 104, and then determine the field-wetness-data based on field-moisture-data acquired by a moisture-sensor for the identified second regions. The controller 108 can then control the speed of the machine 110 accordingly, for example to prevent the machine 110 from travelling faster than a speed-threshold in parts of the field that have a field-wetness-data that exceeds a wetness-threshold-value.

The field-property-data can also include field-contour-data that is representative of contours of the agricultural field 104. A user can provide the field-contour-data to the controller 108 in some examples because this data acquisition can be considered as a one-time job. In other examples, the controller 108 can determine the field-contour-data based on the field-image-data or field-radar-data, for example. The controller 108 can then determine the control-instructions for the machine 110 based on the field-contour-data. For instance, for regions of the agricultural field 104 that have a steep slope (for example, field-contour-data that is representative of a gradient that is greater than a gradient-threshold-value), the controller 108 may determine route-speed-instructions for automatically controlling the speed of the machine 110 such that it does not exceed a speed-threshold. Also, in such circumstances, the controller 108 may determine machine-steering-instructions that prevent a steering angle of the machine 110 from exceeding a steering-angle-threshold. As another example, the controller 108 can determine the machine-route-data for the machine 110 based on the field-contour-data. For example, the controller 108 can calculate a route that, for a big swath on a flank, results in the machine 110 picking up the crop material as it is travelling down a slope that has a gradient that is greater than a gradient-threshold-value. This can provide advantages because in some applications, a tractor that is pulling the machine 110 may not have sufficient power to maintain its optimal speed.

In some examples, the vehicle 106 can include a height-measurement-sensor for acquiring material-height-data representative of the height of the crop material 102. The controller 108 can then determine the control-instructions based on the material-height-data. For instance, the controller 108 may set the route-speed-instructions for the machine 110 based on the material-height-data, such that the machine 110 travels more slowly when the height of the crop material 102 is relatively large. The height measurement can be used as an indicator of the size of the swath. If multiple height measurements are taken whilst the vehicle 106 is moving, they can be combined in order to provide a 3D-scan. The height-measurement-sensor can also be used to measure stub-height-information, which is representative of stub height, if the stub density is high enough. Irrespective of how the stub height is determined, in some examples the controller 108 can subtract the stub height from the measured height of the crop in order to determine swath-height-data. The controller 108 can then determine the control-instructions based on the swath-height-data.

In some examples, the controller 108 can determine a bale-count, representative of an estimate of the number of bales that will be attained by picking up all of the crop material 102, based on the field-data. For instance, the controller 108 can process material-size-data (representative of the size of the crop material), and calculate total-crop-amount that is representative of the total amount of crop that is to be picked up. The controller 108 can then divide the total-crop-amount by the volume of a single bale to determine the bale-count. Providing the bale-count as an output can be useful for planning the operation of picking up the crop material. For instance, the number of trucks that will be needed to collect the bales, and how long the job will take, can be estimated in advance. For an example where the machine 110 is a forage harvester, the controller 108 can calculate the total-crop-volume, and then use this value to determine the number of containers required to receive the crop material from the forage harvester. This type of information can be particularly advantageous inputs for work planning. For instance, the controller 108 can process the total-crop-volume and/or bale-count in order to determine energy requirements of the agricultural machine. For example, if the total-crop-volume is very large, then the controller can determine that the agricultural machine will have to return at some point to a location where it can refill with more energy/fuel. Therefore, the controller 108 can determine a route that takes this into account, and/or can automatically control the agricultural machine 110 such that its available energy/fuel is used in an appropriate way for the required future refill of energy/fuel.

In one particular application, the system of FIG. 1 can be used in the following way:

The unmanned aerial vehicle 106 acquires, from a first altitude: (i) overview-field-data representative of the agricultural field 104 having the crop material 102; and (ii) associated overview-location-data.

The overview-field-data may be overview-field-image-data acquired by a two-dimensional camera. The overview-location-data may be associated with the objects/regions that are represented by the overview-field-image-data, in the same way as the field-location-data described above. This overview-field-data and overview-location-data may be associated with a single image returned from the two-dimensional camera if the unmanned aerial vehicle 106 is at a high enough altitude, or may be obtained from a sequence of images as the unmanned vehicle follows a primary-route. The primary-route may be predefined such that the unmanned aerial vehicle acquires images of the entire agricultural field 104. In some instances, the unmanned aerial vehicle 106 may be pre-loaded with location information (such as GPS coordinates) that defines the boundaries of the agricultural field 104, and a controller associated with the unmanned aerial vehicle 106 can ensure that it acquires overview-field-data that is representative of the entire field 104.

This can be considered as a "first pass" to obtain sufficient information about the location of the crop 102 in the field 104, such that a secondary-route for the unmanned aerial vehicle can be planned, during which more detailed information about the crop 102 is expected to be acquired. This step a) can be performed some time before the machine 110 arrives at the field 104 to pick up the crop material 102.

The controller 108 determines, based on the overview-field-data and the overview-location-data, vehicle-route-data that is representative of a secondary-route to be followed by the unmanned aerial vehicle 106 to acquire secondary information about the crop material 102 that is to be picked up from the field 104.

The controller 108 can determine the location of the crop material 102 in the field 104 using image/object recognition software, and then plan the secondary-route such that the unmanned aerial vehicle 106 will cover all of the identified material in the shortest distance possible, thereby minimising the amount of time that the unmanned aerial vehicle 106 will be acquiring secondary information that is not representative of the crop material 102.

In an alternative example, the controller 108 can plan the secondary-route such that the unmanned aerial vehicle 106 does not follow the swaths, but instead takes a route that includes one or more passes that are transverse to the direction of the swaths. The secondary-route can be planned such that the distance between adjacent passes of the swath satisfies a trade-off between accuracy of acquired data and scanning time. That is, by making the distance between adjacent swath passes larger, the scanning time can decrease but the gathered information can become less accurate as an increased number of interpolations will be required to estimate data between the swath passes. This functionality can be considered as a quick scan option. The controller 108 can then determine vehicle-control-instructions for the unmanned aerial vehicle 106 based on the vehicle-route-data. The vehicle-control-instructions can comprise vehicle-steering-instructions for automatically controlling the direction of travel of the unmanned aerial vehicle 106, such that it follows the secondary-route. This can include setting the altitude of the unmanned aerial vehicle 106, and defining landing-locations at which the unmanned aerial vehicle 106 will land on the ground to acquire measurements.

The unmanned aerial vehicle 106 can then process the vehicle-control-instructions such that it follows the secondary-route; and, whilst following the secondary-route, acquire secondary-field-data representative of the crop material 102 that is to be picked up from the field.

The secondary-field-data may be secondary-field-3D-image-data acquired by a three-dimensional camera or scanner. The unmanned aerial vehicle 106 may acquire the secondary-field-data from a second altitude, wherein the second altitude is lower than the first altitude. In this way, more detailed images of the crop material 102 can be obtained during a "second pass" of the crop material. The three-dimensional camera can consume a relatively large amount of power and/or can require a relatively large memory to store its acquired images. Therefore, limiting the amount of time that the three-dimensional camera is acquiring data can be advantageous.

The controller 108 can optionally determine one or more of the following pieces of crop-property-data based on the secondary-field-data: crop-location-data (which may be more precise than was possible with data obtained from the first altitude), crop-width-data, crop-height-data and crop-shape-data or anything else disclosed herein.

The controller 108 can then determine the control-instructions for the machine 110 to pick up the crop material 102, based on the crop-property-data and/or the secondary-field-data.

This two-stage method of using the unmanned aerial vehicle 106 can be considered an efficient use of resources associated with the unmanned aerial vehicle 106 because the three-dimensional camera is only used to acquire images of the crop material 102 when the unmanned aerial vehicle 106 is close enough to the ground. Also, the three-dimensional camera is not (unnecessarily) used to acquire images of regions of the field 104 that do not have crop material 102 positioned on them.

As an optional further step, the controller 108 can determine the vehicle-route-data so that the unmanned aerial vehicle 106 is controlled such that it lands or flies at a third altitude (that is lower than the second altitude) at specific stub-height-measurement-locations to acquire stub-height-information at some locations. If the unmanned aerial vehicle 106 lands to acquire this information, then the stub-height-measurement-locations can also be referred to as landing-locations. Landing, or flying at the third altitude, can provide an opportunity for sensors on the unmanned aerial vehicle to acquire a macro-vision of the crop material 102 in order to determine the stub-height-information, and in some example to take samples of the crop. This can be used to evaluate the crop particle length, the crop type, etc.

In some examples, the stub-height-information can be determined by applying image recognition software to acquired image-data. The stub-height-information can also be determined by processing tactile-information acquired by a tactile sensor, which senses the top of the stubs when the unmanned aerial vehicle 106 lands or flies at a low enough altitude, optionally in combination with a height sensor that measures the distance between the ground and the tactile sensor on the unmanned aerial vehicle 106.

It may be possible to measure the stub-height-information more accurately from a lower altitude than the second altitude, including from the ground. In some instances, the stub height corresponds to a setting of the machine that cut the crop, such as a combine harvester, and therefore the stub height should have a consistent value throughout the field. However, the stub height can differ from field to field, and therefore there can be advantages to determining the stub height for a particular field, and then subsequently automatically controlling the agricultural machine based on that stub height. It can be considered acceptable to measure the stub height at relatively few locations in the field. In examples where the unmanned aerial vehicle 106 is controlled such that it lands to take these measurements, advantageously, it may only need to land a small number of times to acquire measurements of the stub height that can be applied for the entire field. In one example, the controller 108 can determine the vehicle-route-data such that it includes stub-height-measurement-locations, at which the unmanned aerial vehicle 106 will land to measure stub height. The controller 108 may determine the stub-height-measurement-locations such that the unmanned aerial vehicle lands a predetermined number of times per unit area of the field, for example it lands once for every 1,000 m² or 10,1000 m² of the field. The number of times that the unmanned aerial vehicle 106 lands can be set based on the surface condition of the field. For a uniform field, one measurement every 10,000 m² may be appropriate. For higher precision, a measurement every 1,000 m² could be taken. The number of times that the vehicle lands can be set so as to make an acceptable trade-off between scanning time and precision.

Although there should not be much variation in the stub height throughout a single field, sometimes it can differ, particularly if a combine harvester with a large header is used to cut the crop and/or if the field is not very flat. For instance, if the header is 20 m wide, and the field has small fluctuations, then the stub can have different heights under the header for a single run of the combine harvester, even though the header was set at a fixed height for the single run. In such examples, the controller 108 can advantageously determine the stub height based on measurements taken by the unmanned aerial vehicle 106 at locations in the field that are adjacent to the swath. For example, the controller 108 can determine one or more stub-height-measurement-locations based on the results of processing performed on the overview-field-data and/or the secondary-field-data. In another example, the controller 108 can process a cutting-machine-route, that is representative of the route taken by the cutting machine (such as a combine harvester), to identify one or more stub-height-measurement-locations. The stub-height-measurement-locations can correspond to positions that are adjacent to the swath/crop material 102, such as points that are offset from the centre of the path that was taken by the combine harvester—offset by a distance that corresponds to half of the width of the swath for example. The controller 108 can then determine the vehicle-route-data such that the vehicle acquires stub-height-information at the stub-height-measurement-locations, which may involve landing or stopping at the stub-height-measurement-locations. In this way, a more accurate measurement of the average stub height can be determined.

It will be appreciated that any of the control operations disclosed herein, such as setting the speed or direction of travel of the machine 110 or vehicle 106, can be performed by comparing data with one or threshold values, applying an algorithm to data, or using a look-up-table/database to determine a control value based on received/determined data.

What is claimed is:

1. A system comprising:
an unmanned aerial vehicle configured to acquire, from a first altitude:
overview field-data representative of a field having crop material that is to be picked up from the field; and
associated overview-location-data; and
a controller configured to:
determine, based on the overview-field-data and the overview-location-data, vehicle-route-data that is representative of a secondary-route to be followed by the unmanned aerial vehicle to acquire secondary information about the crop material that is to be picked up from the field; and
determine vehicle-control-instructions for the unmanned aerial vehicle based on the vehicle-route-data, wherein the vehicle-control-instructions comprise vehicle-steering-instructions for automatically controlling the direction of travel of the unmanned aerial vehicle, such that the unmanned aerial vehicle follows the secondary-route;
wherein the unmanned aerial vehicle is further configured to:
process the vehicle-control-instructions such that it follows the secondary-route; and
while following the secondary-route, acquire secondary-field-data representative of the crop material that is to be picked up from the field, from a second altitude, wherein the second altitude is lower than the first altitude; and
wherein the controller is further configured to determine control-instructions for a machine to pick up the crop material, based on the secondary-field-data,
wherein the control-instructions comprise machine-steering-instructions for automatically controlling the direction of travel of the machine, such that the machine follows a specific route through the field.

2. The system of claim 1, wherein the controller is further configured to:
determine material-map-data that is representative of the location of rows of the crop material that are to be picked up from the field, based on the field-data; and
determine the control-instructions for the machine to pick up the crop material, based on the material-map-data.

3. The system of claim 2, wherein the controller is further configured to:

determine machine-route-data, representative of the specific route to be taken by the machine, based on the material-map-data; and determine the control-instructions for the machine based on the machine-route-data.

4. The system of claim 1, wherein the control-instructions further comprise route-speed-instructions for automatically controlling the speed of the machine at locations along the specific route.

5. The system of claim 1, wherein:
the vehicle is also configured to acquire field-location-data associated with the field-data; and
the controller is further configured to determine the control-instructions based on the field-data and the field-location-data.

6. The system of claim 1, wherein the controller is further configured to:
determine crop-property-data that is representative of the crop material in the field, based on the field-data; and
determine the control-instructions for the machine to pick up the crop material, based on the crop-property-data.

7. The system of claim 6, wherein the crop-property-data is representative of one or more of:
material-size-data;
crop-type;
temperature of material;
humidity of material;
length of stalks in the material;
material density; and
stub height.

8. The system of claim 1, wherein the controller is further configured to:
determine field-property-data that is representative of a property of the field, based on the field-data; and
determine the control-instructions also based on the field-property-data.

9. The system of claim 8, wherein the field-property-data comprises field-contour-data or field-wetness-data.

10. The system of claim 1, wherein:
the controller is further configured to determine the vehicle-control-instructions for the unmanned aerial vehicle such that it includes stub-height-measurement-locations;
the unmanned aerial vehicle is further configured to land at the stub-height-measurement-locations and acquire stub-height-information; and the controller is further configured to determine the control-instructions for the machine to pick up the crop material, also based on the stub-height-information.

11. The system of claim 1, wherein the vehicle comprises an unmanned land vehicle.

12. The system of claim 1, wherein the system further comprises a machine that is configured to be operated in accordance with the control-instructions.

13. A method of controlling an agricultural machine, the method comprising:
acquiring, from a first altitude by an unmanned aerial vehicle:
overview-field-data representative of a field having crop material that is to be picked up from the field; and
associated overview-location-data;
determining, based on the overview-field-data and the overview-location-data, vehicle-route-data that is representative of a secondary-route to be followed by the unmanned aerial vehicle to acquire secondary information about the crop material that is to be picked up from the field;
determining vehicle-control-instructions for the unmanned aerial vehicle based on the vehicle-route-data, wherein the vehicle-control-instructions comprise vehicle-steering-instructions for automatically controlling the direction of travel of the unmanned aerial vehicle, such that the unmanned aerial vehicle follows the secondary-route;
processing the vehicle-control-instructions by the unmanned aerial vehicle such that it follows the secondary-route, and whilst following the secondary-route, acquiring secondary-field-data representative of the crop material that is to be picked up from the field, from a second altitude, wherein the second altitude is lower than the first altitude; and
determining control-instructions for the agricultural machine to pick up the crop material, based on the secondary-field-data, wherein the control-instructions comprise machine-steering-instructions for automatically controlling the direction of travel of the agricultural machine, such that the agricultural machine follows a specific route through the field.

* * * * *